(12) United States Patent
Tian et al.

(10) Patent No.: US 9,077,806 B2
(45) Date of Patent: Jul. 7, 2015

(54) METHOD, SYSTEM AND APPARATUS FOR IMPLEMENTING SECURE CALL FORWARDING (75) Inventors: Tian Tian, Shenzhen (CN); Yumen Zhu, Shenzhen (CN); Yinxing Wei, Shenzhen (CN); Feng Gao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 152 days.

(21) Appl. No.: 13/258,258

(22) PCT Filed: Feb. 23, 2011

(86) PCT No.: PCT/CN2011/071203
§ 371 (c)(1),
(2), (4) Date: May 1, 2012

(87) PCT Pub. No.: WO2011/131055
PCT Pub. Date: Oct. 27, 2011

(65) Prior Publication Data
US 2012/0207297 A1 Aug. 16, 2012

(30) Foreign Application Priority Data
Apr. 21, 2010 (CN) .......................... 2010 1 0154329

(51) Int. Cl.
*H04M 3/42* (2006.01)
*H04M 3/54* (2006.01)
*H04L 29/06* (2006.01)
(Continued)

(52) U.S. Cl.
CPC ............... *H04M 3/54* (2013.01); *H04L 63/062* (2013.01); *H04M 3/2281* (2013.01); *H04M 7/006* (2013.01); *H04W 4/16* (2013.01); *H04W 12/04* (2013.01); *H04L 65/1016* (2013.01); *H04L 65/1096* (2013.01)

(58) Field of Classification Search
USPC ............. 379/211.01, 211.02, 212.01, 213.01, 379/214.01; 380/279, 281
See application file for complete search history.

(56) References Cited

U.S. PATENT DOCUMENTS

2003/0131236 A1* 7/2003 Sasmazel ...................... 713/171
2003/0177099 A1 9/2003 Gallant et al.
(Continued)

FOREIGN PATENT DOCUMENTS

CN 101022601 A 8/2007
CN 101150631 A 3/2008
(Continued)

OTHER PUBLICATIONS

International Search Report for PCT/CN2011/071203 dated May 26, 2011.
(Continued)

*Primary Examiner* — William Deane, Jr.
(74) *Attorney, Agent, or Firm* — Banner & Witcoff, Ltd.

(57) ABSTRACT

A method, system and apparatus for implementing secure call forwarding are provided in the present invention. The method includes: a calling party calling a called party, the called party triggering the subscribed call forwarding service; a key management server (KMS) obtaining information of a legal call-forwarded party of the called party through an application server; the call-forwarded party obtaining a media key from the KMS; and the calling party establishing a call connection with the call-forwarded party.

12 Claims, 6 Drawing Sheets (51) Int. Cl.
*H04M 3/22* (2006.01)
*H04W 12/04* (2009.01)
*H04M 7/00* (2006.01)
*H04W 4/16* (2009.01)

(56) References Cited

U.S. PATENT DOCUMENTS

| | | | |
|---|---|---|---|
| 2006/0212933 A1* | 9/2006 | Scoggins et al. | 726/11 |
| 2007/0147600 A1* | 6/2007 | Stahlman et al. | 379/266.07 |
| 2008/0240433 A1* | 10/2008 | Fahn et al. | 380/255 |
| 2008/0240447 A1* | 10/2008 | Zhu et al. | 380/279 |
| 2009/0022324 A1* | 1/2009 | Inokuchi et al. | 380/279 |
| 2010/0150352 A1* | 6/2010 | Mansour et al. | 380/281 |
| 2011/0176675 A1* | 7/2011 | Hughes et al. | 380/44 |
| 2011/0225417 A1* | 9/2011 | Maharajh et al. | 713/150 |
| 2012/0002816 A1* | 1/2012 | Tian et al. | 380/270 |
| 2012/0099729 A1* | 4/2012 | Tian et al. | 380/279 |
| 2012/0246480 A1* | 9/2012 | Selander et al. | 713/168 |

FOREIGN PATENT DOCUMENTS

| | | |
|---|---|---|
| CN | 101170612 A | 4/2008 |
| CN | 101316384 A | 12/2008 |

OTHER PUBLICATIONS

3GPP TS 33.328 V9.1.0—3rd Generation Partnership Project; Technical Specification Group Service and System Aspects; IP Multimedia Subsystem (IMS) media plane security (Release 9), Mar. 2010.

* cited by examiner

METHOD, SYSTEM AND APPARATUS FOR IMPLEMENTING SECURE CALL FORWARDING

TECHNICAL FIELD

The present invention relates to the network communication security technology, and in particular, to a method, system and apparatus for implementing secure call forwarding in an IP multimedia subsystem (IMS for short).

BACKGROUND OF THE RELATED ART

In the session initiation protocol (SIP for short) system, call forwarding (communication diversion) is a common and practical service, which makes the call server of the called party forward the call to the user equipment of the call-forwarded party, when the called party enabling the call forwarding service is in an unreachable or busy or other states in the call process, thus improving the flexible configurability of the call, wherein the user equipment of the call-forwarded party is set in advance by the called party.

The call forwarding includes the following several service types: call forwarding busy (CFB), call forwarding no reply (CFNR), call forwarding unconditional (CFU), call forwarding no reachable (CFNRc), call forwarding no login (CFNL) and communication diversion (CD). The service allows the user to forward all its incoming call to another telephone number which is set in advance, or a voice mail of the user. When activating the call forwarding unconditional (CFU), the system can also provide a permitted call. The call forwarding also includes a special case of a plurality of forwarding call, that is, the user A calls the user B, the user B uses the call forwarding service, the call is forwarded to the user C, the user C also uses the call forwarding service, and the call is further forwarded to the user D.

It is introduced briefly hereinafter that the call server sends a call request message to the call-forwarded party through the IMS network in the call forwarding service (defined as INVITE message in the protocol, the message is based on the SIP protocol). When the call forwarding occurs, the call server receives the INVITE message including the ticket from the calling party, and forwards the message to the call-forwarded party, and adds a CAUSE parameter (the CAUSE parameter represents that the call forwarding service is used and the type used therein), and for the specific usage and instruction, please refer to RFC4458 and TS24.604 v9.2.0.

For example, the calling party is user 1, which is identified as user1_public1@home1.net, and the called party is user 2, which is identified as user2_public1@home1.net. The user 2 enables the call forwarding unconditional service, and the target of the call forwarding is set as user 3, which is identified as user-3@example.com. The call server to which the user 2 belongs forwards to the user 3 a call from the user 1 to the user 2, and includes the state parameter "CAUSE=302" in the INVITE message sent to the user 1 The parameter of which the value is 302 represents that the call type is call forwarding unconditional.

Figure 1:
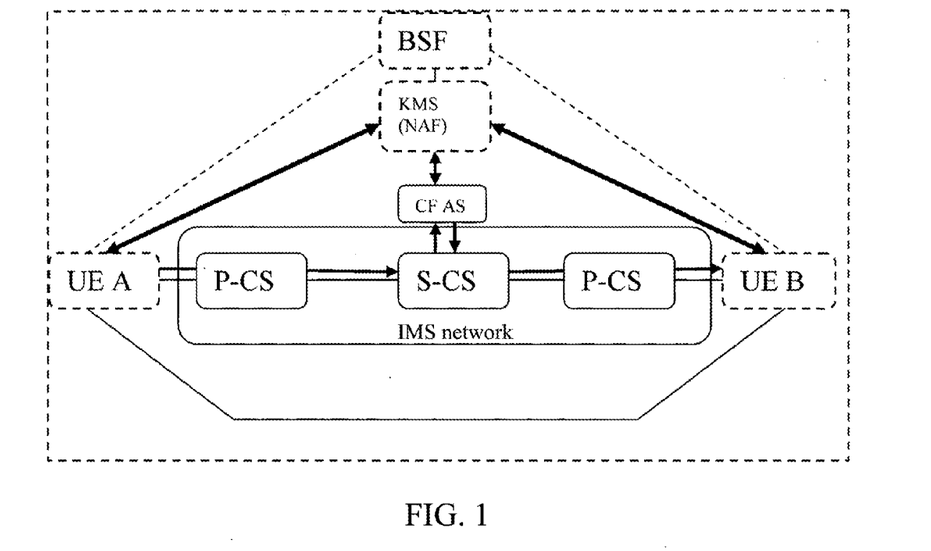
FIG. 1 is a framework diagram of the IMS media security solution based on the KMS in the prior art.

The key management server (KMS for short) is used in the IMS media plane security in the 3GPP TS33.328. FIG. 1 is a framework diagram of the IMS media security solution based on the KMS in the related art, wherein, the user A (UE-A) and the user B (UE-B) are the sending party and receiving party of the media message; the key management server (KMS), as a reliable third party, realizes the management and distribution function of the key; proxy-call session control function (P-CSCF) and service-call session control function (S-CSCF) are network elements in the IMS network; for the function introduction of other network elements, please refer to the relevant documents.

Figure 2:
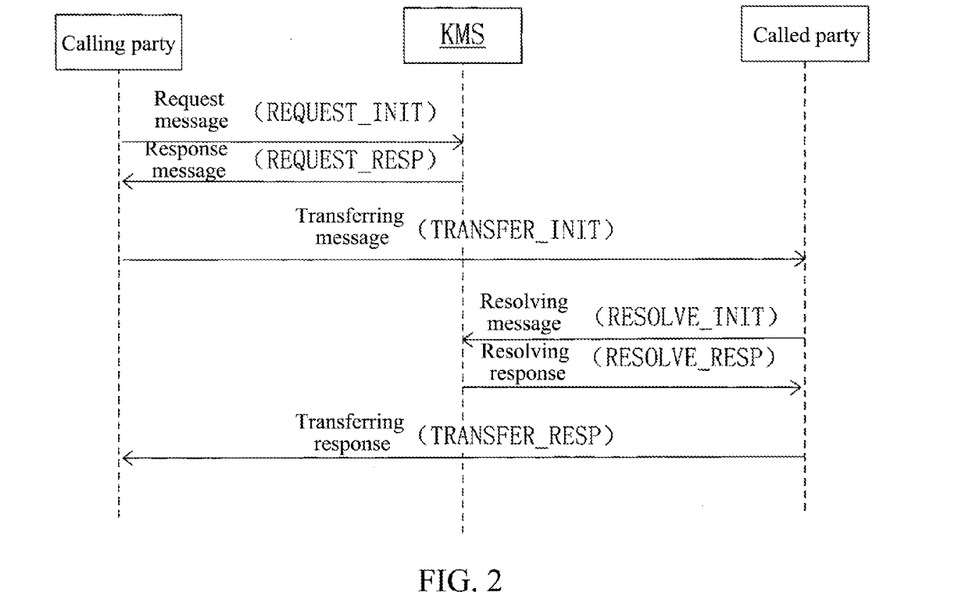
FIG. 2 is a diagram of a call process based on the KMS in the prior art.

FIG. 2 is a diagram of a call process based on the KMS in the prior art. In the process of establishing the call of the calling party and the called party, the calling party sends a request message (REQUEST-INT) to the KMS to request the relevant key and ticket. The KMS returns a response message (REQUEST-RESP) to the calling party, where the response message includes the ticket requested by the calling party, wherein the ticket is based on the public user identifier of the called party, and the ticket includes the encrypted relevant key, calling party identifier and called party identifier. The calling party sends the ticket to the called party through the transmission message (TRANSFER-INIT). Since the called party is unable to decrypt the ticket, the ticket is sent to the KMS through the resolution message (RESOLVE-INIT), then the KMS decrypts the ticket, and after decrying the ticket, returns the relevant key therein to the called party. The KMS acquires the called party identifier through the ticket, and compares whether the called party identifier in the ticket and a reply party identifier which sends the TRANSFER-INIT message are the same; if the two identifiers are the same, then it will be judged that the reply party is the legal called party.

In the common call process, the reply party which sends the RESOLVE-INIT to the KMS is the called party in the call, which can pass through the authentication on the called user identity by the KMS successfully; in the branching call case, one calling party calls a plurality of called parties at the same time, however, a plurality of called parties are all corresponding to one same public user identifier, so a plurality of reply terminals can also pass through the user identity authentication; while in the call forwarding case, the call-forwarded party can be set arbitrarily at any time by the user using the service, and finally the reply party may have different public user identifier from the original called party respectively. In the situation, the above-mentioned authentication method for the public user identifier based on the called party will be no longer applicable, which causes that it is unable to authenticate the identity of the reply party, thus causing the call failed. So the new solution is needed to realize the secure call forwarding.

CONTENT OF THE INVENTION

The technical problem to be solved by the present invention is to provide a method, system and apparatus for implementing secure call forwarding, to implement the identity authentication of the call-forwarded party, thus realizing the secure call forwarding in the IMS system.

In order to solve the above-mentioned technical problem, the present invention provides a method for implementing secure call forwarding, comprising:

a calling party calling a called party, and the called party triggering a subscribed call forwarding service;

a key management server obtaining information of a legal call-forwarded party of the called party through an application server;

the call-forwarded party obtaining a media key from the key management server; and the calling party establishing a call connection with the call-forwarded party.

The above-mentioned method also has the following features:

the step of the key management server (KMS) obtaining information of a legal call-forwarded party of the called party through an application server comprises:

the application server including encrypted binding relation information of the called party and the call-forwarded party in a call request message and sending the call request message to the call-forwarded party; and the key management server judging whether the call-forwarded party is a legal call-forwarded party of the called party according to a message including the encrypted binding relation information sent by the call-forwarded party.

The above-mentioned method also has the following features:

the encrypted binding relation information of the called party and the call-forwarded party comprises encrypted binding information of a called party identifier and a call-forwarded party identifier in a current call forwarding, and the encrypted binding information of the called party identifier and the call-forwarded party identifier in all previous call forwarding.

The above-mentioned method also has the following features:

the step of the key management server obtaining information of a legal call-forwarded party of the called party through an application server comprises:

the application server judging whether the call-forwarded party is a legal call-forwarded party of the called party according to information of the called party and the call-forwarded party provided by the key management server, and feeding the judging result back to the key management server.

The above-mentioned method also has the following features:

the step of the key management server obtaining information of a legal call-forwarded party of the called party through an application server comprises:

the application server returning a call forwarding user identifier list of the called party to the key management server according to the called party information provided by the key management server; and the key management server judging whether the call-forwarded party is a legal call-forwarded party of the called party according to the call forwarding user identifier list of the called party.

In order to solve the above-mentioned technical problem, the present invention further provides a system for implementing secure call forwarding, comprising: a calling party, a called party, a call-forwarded party, an application server and a key management server;

the calling party is configured to call the called party;

the called party is configured to trigger a subscribed call forwarding service according to a call of the calling party;

the key management server is configured to obtain information of the legal call-forwarded party of the called party through the application server; and the call-forwarded party is configured to obtain a media key from the key management server.

The above-mentioned system also has the following characteristics:

the application server is configured to include encrypted binding relation information of the called party and the call-forwarded party in a call request message, and send the call request message to the call-forwarded party; and the key management server is configured to judge whether the call-forwarded party is a legal call-forwarded party of the called party according to a message including the encrypted binding relation information sent by the call-forwarded party.

The above-mentioned system also has the following features:

the application server is configured to send a call request message to the call-forwarded party, and include encrypted binding information of a called party identifier and a call-forwarded party identifier in a current call forwarding, and the encrypted binding information of the called party identifier and the call-forwarded party identifier in all previous call forwarding in the message.

The above-mentioned system also has the following features:

the application server is configured to judge whether the call-forwarded party is a legal call-forwarded party of the called party according to information of the called party identifier and the call-forwarded party provided by the key management server, and feeding the judging result back to the key management server.

The above-mentioned system also has the following features:

the application server is configured to return a call forwarding user identifier list of the called party to the key management server according to the called party information provided by the key management server; and the key management server is configured to judge whether the call-forwarded party is a legal call-forwarded party of the called party according to the call forwarding user identifier list of the called party.

In order to solve the above-mentioned technical problem, the present invention further provides a key management server, comprising:

a message receiving module, configured to receive a media key request message of a call-forwarded party of a call; and an authentication module, configured to authenticate the call-forwarded party according to call forwarding information of a called party provided by an application server.

The above-mentioned key management server also has the following features:

the authentication module is configured to judge whether the call-forwarded party is a legal call-forwarded party of the called party according to encrypted binding relation information of the called party and the call-forwarded party provided by the application server; and the encrypted binding relation information is included in the media key request message.

The above-mentioned key management server also has the following features:

the key management server further comprises a message sending module;

the message sending module is configured to send a request message including the called party information to the application server, to request the application server to return a call forwarding user identifier list of the called party; and the authentication module is configured to judge whether the call-forwarded party is a legal call-forwarded party of the called party according to the call forwarding user identifier list of the called party returned by the application server.

The above-mentioned key management server also has the following features:

the key management server further comprises a message sending module;

the message sending module is configured to send a request message carrying the information of the called party and the call-forwarded party to the application server, to request the application server to judge whether the call-forwarded party is a legal call-forwarded party of the called party; and the authentication module is configured to acquire whether the call-forwarded party is a legal call-forwarded party of the called party according to the judging result returned by the application server.

In order to solve the above-mentioned technical problem, the present invention further provides an application server, comprising: a judging module, configured to judge whether the call-forwarded party is a legal call-forwarded party of the called party according to information of a called party and a call-forwarded party provided by a key management server; and a sending module, configured to feed back the judging result to the key management server.

The present invention provides a new key negotiation mechanism that the secure call forwarding is implemented in the IMS system and basically keeps the message format of the original IMS system.

PREFERRED EMBODIMENTS OF THE PRESENT INVENTION

The system for implementing secure call forwarding in the present invention includes: a calling party, a called party, a call-forwarded party, an application server and a key management server (here it is the general name of the reliable third party used for implementing the key management and distribution). The case that the called party sets the call-forwarded party as the call forwarding target to trigger the call forwarding service subscribed by the called party is one of the following scenarios: call forwarding unconditional (CFU), call forwarding no reply (CFNR), call forwarding no reachable (CFNRc), call forwarding busy (CFB), communication diversion service (CD) and call forwarding no login (CFNL). The application server can be used as the call forwarding server. The application server, when being the call server to which the called party belongs, is used to send a call request message to the call-forwarded party after receiving the call from the calling party to the called party. Wherein, the calling party is configured to call the called party;

the called party is configured to trigger a subscribed call forwarding service according to a call of the calling party;

the key management server is configured to obtain information of the legal call-forwarded party of the called party through the application server; and the call-forwarded party is configured to obtain a media key from the key management server.

The first implementation mode of the present system is applied to the case of single call forwarding, and the call forwarding process relates to three user parties: the calling party, the called party and the call-forwarded party. The application server is configured to include encrypted binding relation information of the called party and the call-forwarded party in a call request message, and send the call request message to the call-forwarded party; and the key management server is configured to judge whether the call-forwarded party is a legal call-forwarded party of the called party according to a message including the encrypted binding relation information sent by the call-forwarded party.

In specific application:

after receiving the call request message, the call-forwarded party is used to include an identifier of the call-forwarded party and the encrypted binding information when sending a media key request to the key management server; the key management server is used to, upon verifying that the identifier of the call-forwarded party in the encrypted binding information is coincident with the identifier of the call-forwarded party carried in the media key request sent by the call-forwarded party, determine that the call-forwarded party is a legal call-forwarded party.

When the first implementation mode of the present system is applied to the case of multiple call forwarding, the call forwarding process relates to multiple user parties, including: the calling party, the called party and a plurality of call-forwarded parties. According to the time sequence of the multiple call forwarding, the call-forwarded parties are successively: the first call-forwarded party, the second call-forwarded party, . . . , the next to last call-forwarded party, the last call-forwarded party, wherein, the called party, the first call-forwarded party, the second call-forwarded party, . . . , the next to last call-forwarded party are corresponding to one call server respectively.

The application server, acting as the call server of the called party in one of the multiple call forwarding, is used to send the call request message to the call server to which the call-forwarded party belongs, and include in this call forwarding the encrypted binding information of the called party identifier and the call-forwarded party identifier and the encrypted binding information of the called party identifier and the call-forwarded party identifier in all previous call forwarding processes;

after receiving the call request message, the last call-forwarded party is used to include the last call-forwarded identifier and the encrypted binding information in all previous call forwarding in the media key request message sent to the key management server after;

after receiving the media key request message, the key management server is used to, upon verifying that the last call-forwarded party identifier carried in the media key request message is coincident with the last call-forwarded party identifier in the encrypted binding information of the last call forwarding, sequentially verify the call-forwarded party identifier in each encrypted binding information according to the encrypted binding information generation time, from the latest to the oldest. And the key management server is used to determine that the last call-forwarded party is the legal call-forwarded party when all verifications succeed.

When the first query mode is used in the second implementation mode of the present system, the application server is used to judge whether the call-forwarded party is a legal call-forwarded party of the called party according to the information of the called party and the call-forwarded party provided by the key management server, and feed back the judgment result to the key management server.

The second implementation mode of the present system adopts the first query mode and is applied to the case of single call forwarding, and the call forwarding process relates to three user parties: the calling party, the called party and the call-forwarded party.

The call-forwarded party is used to, after receiving the call request message sent by the call sever to which the called party belongs, send the media key request message to the key management server, where the identifier of the call-forwarded party is included in the media key request message;

after receiving the media key request message, the key management server is used to send a query message to the call server to which the called party belongs, and include the identifier of the called party and the call-forwarded party in the query message; and also used to determine that the call-forwarded party is a legal call-forwarded party after receiving the success confirmation message returned by the call server;

after receiving the query message, the call server to which the called party belongs is used to, upon determining that the call-forwarded party is the call forwarding target set by the called party, notify the key management server of the success confirmation message.

The second implementation mode of the present system uses the first query mode, and is applied to the case of multiple call forwarding, and the call forwarding process relates to multiple user parties, including: the calling party, the called party and a plurality of call-forwarded parties. According to the time sequence of the multiple call forwarding, the call-forwarded parties are successively: the first call-forwarded party, the second call-forwarded party, . . . , the next to last call-forwarded party, the last call-forwarded party, wherein, the called party, the first call-forwarded party, the second call-forwarded party, . . . , the next to last call-forwarded party are corresponding to one call server respectively.

When receiving the query message and determining that the first call-forwarded party is the call forwarding target set by the called party, the call server to which the called party belongs is use to notify the key management server of the success confirmation message through each call server;

The application server, acting as the call server of the called party in one of the multiple call forwarding, is used to send the call request message to the call-forwarded party in the current call forwarding. And the call server includes the called party identifier in the current call forwarding and the called party identifier in all previous call forwarding processes. The call server is also used to receive the query message from the call server to which the call-forwarded party belongs in the current call forwarding, and determine that the call-forwarded party in the current call forwarding is the call forwarding target set by the called party in the current call forwarding. In the meanwhile, the call server sends the query message to the call server to which the previous call-forwarded party of the called party, and include all called party identifiers in all previous call forwarding processes between the called party and the current call-forwarded party.

After receiving the call request message from the call server to which the next to last call-forwarded party belongs, the last call-forwarded party is used to send the media key request message to the key management server, and include the identifier of the last call-forwarded party and the called party identifier in all previous call forwarding processes.

After receiving the media key request message, the key management server is used to send the query message to the call server to which the next to last call-forwarded party belongs, and include all called party identifiers in all previous call forwarding processes; and is also used to determine that the last call-forwarded party is the legal call-forwarded party after receiving the success confirmation message.

When the second implementation mode of the present system uses the second query mode, the application server is used to return a call forwarding user identifier list of the called party according to the called party information provided by the key management server; and the key management server is used to judge whether the call-forwarded party is a legal call-forwarded party of the called party.

When the second implementation mode of the present system uses the second query mode and is applied to the case of single call forwarding, the call forwarding process relates to three user parties: the calling party, the called party and the call-forwarded party.

The call-forwarded party is used to, after receiving the call request message sent by the call sever to which the called party belongs, send the media key request message to the key management server and include the identifier of the call-forwarded party in the media key request message;

after receiving the media key request message from the call-forwarded party, the key management server is used to send a query message to the call server to which the called party belongs, and include the identifier of the called party in the query message; and also used to determine that the identifier of the call-forwarded party lies in the list upon receiving the call forwarding target list set by the called party from the call server and determine that the call-forwarded party is a legal call-forwarded party;

the call server is use to send the call forwarding target list set by the called party to the key management server after receiving the query message form the key management server.

The second implementation mode of the present system uses the second query mode and is applied to the case of multiple call forwarding, and the call forwarding process relates to multiple user parties, including: the calling party, the called party and a plurality of call-forwarded parties. According to the time sequence of the multiple call forwarding, the call-forwarded parties are successively: the first call-forwarded party, the second call-forwarded party, . . . , the next to last call-forwarded party, the last call-forwarded party, wherein, the called party, the first call-forwarded party, the second call-forwarded party, . . . , the next to last call-forwarded party are corresponding to one call server respectively.

The application server, acting as the call server of the called party in one of the multiple call forwarding, is used to send the call request message to the call-forwarded party in the current call forwarding. And after receiving the query message sent by the key management server, the call server is also used to send the call forwarding target list set by the called party in its own executed call forwarding process to the key management server.

The last call-forwarded party is used to send the media key request message to the key management server and include the last call-forwarded identifier after receiving the call request message.

The key management server is used to, after receiving the media key request message from the last call-forwarded party, send the query message to the call server to which the next to last call-forwarded party belongs, and include the identifier of the next to last call-forwarded party in the query message. And the key management is also used to, after receiving the list from one call server and determining that the call-forwarded party corresponding to the call server lies in the list, and send the query message to the previous call server before this call server according to the order from back to forward of execution time of each call forwarding, and include the identifier of the call-forwarded party corresponding to the previous call server. And the key management is also used to determine that the last call-forwarded party is a legal call-forwarded party upon receiving the call forwarding target list set by the called party and returned by the call server to which the called party belongs and judging that the identifier of first call-forwarded party lies in the list.

Figure 3:
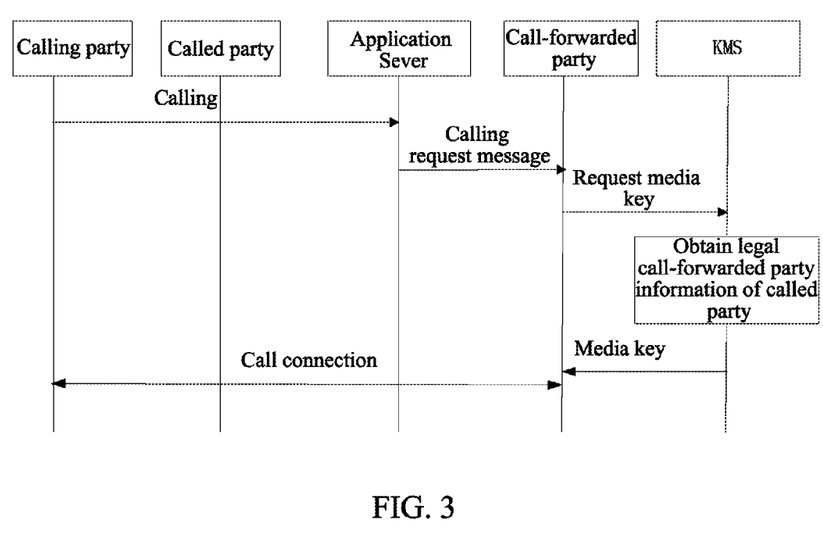
FIG. 3 is a diagram of a method for implementing secure call forwarding in an embodiment.

Corresponding to the above-mentioned system, as shown in FIG. 3, the method for implementing secure call forwarding includes: a calling party calling a called party, and the called party triggering a subscribed call forwarding service; a key management server obtaining information of a legal call-forwarded party of the called party through an application server; the call-forwarded party obtaining a media key from the key management server; and the calling party establishing a call connection with the call-forwarded party.

In the present invention, the case that triggers the call forwarding service subscribed by the called party is one of the following scenarios: call forwarding unconditional (CFU), call forwarding no reply (CFNR), call forwarding no reachable (CFNRc), call forwarding busy (CFB), communication diversion service (CD) and call forwarding no login (CFNL).

In the method of the present invention, the key management server authenticates the call-forwarded party to ensure the secure implementation of the call forwarding. The present invention is applied to single call forwarding and multiple call forwarding.

The present invention is described in detail through a plurality of embodiments hereinafter.

Embodiment 1

The present embodiment 1 is applied to two cases of call forwarding; one is single call forwarding and the other is multiple call forwarding.

In the case of single call forwarding, the process of the key management server obtaining the information of the legal call-forwarded of the called party through the application server includes: the application server includes encrypted binding relation information of the called party and the call-forwarded party in a call request message and sends the call request message to the call-forwarded party; and the key management server determines whether the call-forwarded party is a legal call-forwarded party of the called party according to the message including the encrypted binding relation information sent by the call-forwarded party.

In specific application, when the call server to which the called party belongs sends the call request message to the call-forwarded party, the call request message includes the encrypted binding information of the called party identifier and the call-forwarded party identifier. And the call-forwarded party includes the identifier of the call-forwarded party and the encrypted binding information when sending a media key request to the key management server. The key management server determines that the call-forwarded party is a legal call-forwarded party when verifying that the identifier of the call-forwarded party in the encrypted binding information is coincident with the identifier of the call-forwarded party carried in the media key request sent by the call-forwarded party.

The encrypted binding message sent by the call server to which the called party belongs is the binding information of the called party identifier and the call-forwarded party identifier encrypted by the shared key of the call server and the key management server; the key management server decrypts the binding message using the shared key after receiving the encrypted binding message sent by the call-forwarded party.

Figure 4:
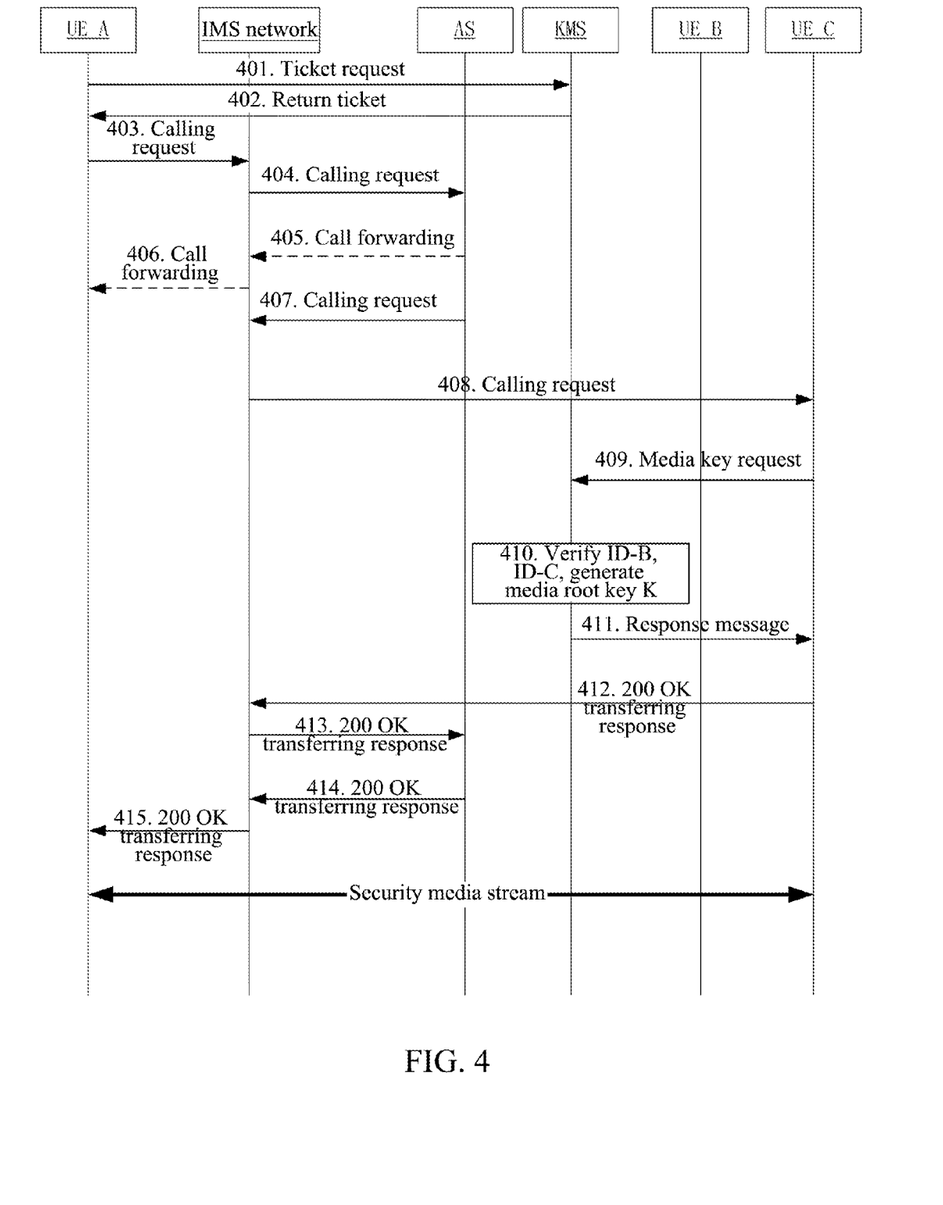
FIG. 4 is a diagram of a method for implementing secure call forwarding in single call forwarding of embodiment 1.

FIG. 4 is a diagram of a method for implementing secure call forwarding in single call forwarding. The user A is the calling party, the user B is the called party, the user C is the call forwarding target set by the user B, that is, the call-forwarded party, and the AS is the call server to which the called party belongs.

In step 401, the user A sends a ticket request to the KMS to apply the ticket for calling the user B.

In step 402, the KMS verifies the user A, generates the corresponding ticket and sends the ticket to the user A.

In step 403, the user A sends a call request message to the IMS network, and the call request message includes the ticket; specifically, the user A puts the TRANSFER_INIT message including the ticket in the SIP INVITE message and sends the SIP INVITE message to the IMS network.

In step 404, the IMS network forwards the received INVITE message to the AS to which the called party belongs.

In step 405~406, since the user B uses the call forwarding unconditional service, the AS notify the user A that the call is forwarded through the IMS network.

In step 407, the AS sends the call request messages to the IMS network according to the forwarding number set by the user B, and includes the encrypted binding information of the user B identifier and the user C identifier in the call request message. The encrypted binding message refers to the binding information of the user B and the user C encrypted by using the shared key Kas of the AS and the KMS, that is, Eas (ID-B, ID-C); and also includes identifiers of the AS (including the public user identifier, if the common authorization mechanism GBA is used in the process, also including the GBA identifier, that is, BTID). Specifically, the AS includes above-mentioned information and the ticket received from the user A in the SIP INVITE message, and forwards the SIP INVITE message through the IMS network.

In step 408, the IMS network forwards the INVITE message to the user C.

In step 409, the user C, after receiving the INVITE message, sends the media key request message to the KMS, and includes the user C identifier (including the public user identifier, if common authorization mechanism GBA is used in the process, also including the GBA identifier, that is, BTID) and information received from the AS (including encrypted binding information) and the call forwarding indication in the message.

In step 410, the KMS can acquire that the call is call forwarding according to the call forwarding indication or the AS information included in the information. The KMS can find the shared keys Kas of the KMS and the call server according to the identifier of the AS, decrypts the binding information encrypted by the Kas in the message. And then the KMS can obtain the ID-B and the ID-C, and determine whether the user C identifier of the binding information is same as the user C identifier included in the media key request message. If yes, it indicates the user C is a legal call-forwarded user, and then the KMS further decrypts the media key information in the ticket, uses the key shared with the user C to encrypt the media key information. And the KMS puts the success response into the RESOLVE-RESP message. If no, the KMS returns a failure response to the user C and ends this call.

In step 411, the KMS puts the RESOLVE_RESP message into a response message and returns the response message to the user C.

In steps 412~415, the user C receives the RESOLVE_RESP message, obtains the media key information included in the ticket decrypted by the KMS, generates the TRANSFER_RESP message, and includes the message in the 200_Ok message and replies the user A through the IMS network with the 200_OK message.

In step 416, the user A establishes the connection with the user C, and communicates the secure media streams.

Through the above-mentioned flow, the user A and the user C can obtain the key information of the encrypted media flow, thus performing the end-to-end secure encrypted media flow communication.

In the case of multiple forwarding call, when the called party meets the triggering condition, the application server to which the called party belongs sends the call request message to the called party, where the message includes the encrypted binding information of the called party identifier and the call-forwarded party identifier in this call forwarding, and the encrypted binding information of the called party identifier and the call-forwarded party identifier in all previous call forwarding processes.

In specific application, in each forwarding call process of the multiple forwarding call, when the call server to which the current called party belongs sends the call request message to the call server to which the call-forwarded party belongs in the current forwarding call. The call request message includes the encrypted binding information of the called party identifier and the call-forwarded party identifier in the current call forwarding and the encrypted binding information of the called party identifier and the call-forwarded party identifier in all previous call forwarding. The last call-forwarded party is used to include the last call-forwarded identifier and the encrypted binding information in all previous call forwarding in the media key request message sent to the key management server. The key management server, verifies that the last call-forwarded party identifier included in the media key request message is coincident with the last call-forwarded party identifier in the encrypted binding information of the last call forwarding. The key management server sequentially verifies the call-forwarded party identifier in each encrypted binding information according to the encrypted binding information generation time, from the latest to the oldest. And the key management server determines that the last call-forwarded party is the legal call-forwarded party when all verifications succeed.

The encrypted binding message sent by the call server is the binding information of the called party identifier and the call-forwarded party identifier encrypted by the shared key of the call server and the key management server; after receiving the encrypted binding message sent by the call-forwarded party, the key management server decrypts the binding message by using the shared key. In the practical application, the shared key used by each call server may be the same or different.

Embodiment 2

In the first implementation mode of embodiment 2, the KMS sends the called party identifier and the call-forwarded party identifier to the AS to which the called party belongs in the call forwarding process, the AS judges the legality of the call-forwarded party and notifies the KMS of it. The process of the key management server obtaining the legal call-forwarded party information of the called party through the application server includes: the application server determines whether the call-forwarded party is the legal call-forwarded party of the called party according to the information of the called party and the call-forwarded party provided by the key management server, and feeds back the determining result to the key management server.

The first implementation mode is applied to two cases of call forwarding: one is single call forwarding and the other is multiple call forwarding.

In the case of single call forwarding, the call-forwarded party, after receiving the call request message sent by the call sever to which the called party belongs, sends the media key request message to the key management server and includes the identifier of the call-forwarded party. The key management server sends a query message to the call server to which the called party belongs, and includes the identifier of the called party and the call-forwarded party in the query message. The call server to which the called party belongs, when determining that the call-forwarded party is the call forwarding target set by the called party, notifies the key management server of the success confirmation message. And the key management server determines that the call-forwarded party is a legal call-forwarded party.

Figure 5:
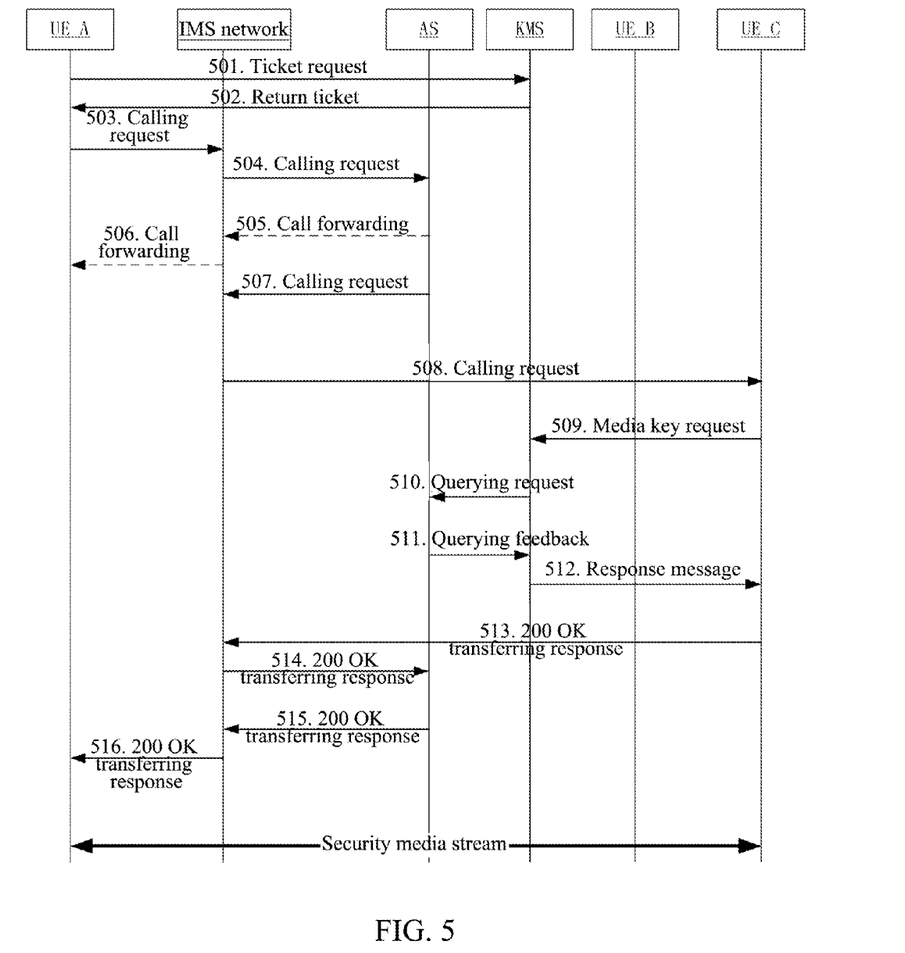
FIG. 5 is a diagram of a method for implementing secure call forwarding in single call forwarding using a first query mode of embodiment 2.

FIG. 5 is a diagram of a method for implementing secure call forwarding in single call forwarding. The user A is the calling party, the user B is the called party, the user C is the call forwarding target set by the user B, that is, the call-forwarded party, and the AS is the call server to which the called party belongs.

Steps 501~506 are correspondingly the same with steps 401~406;

In step 507, the difference between this step and step 407 is that the AS includes the called party identifier, that is, the ID-B and its own identifier, that is, the ID-AS in the INVITE message.

In step 508, the IMS network forwards the INVITE message to the user C.

In step 509, the user C, after receiving the INVITE message, sends the media key request message to the KMS, and includes the user C identifier (including the public user identifier, if common authorization mechanism GBA is used in the process, also including the GBA identifier, that is, BTID) and information received from the AS (including encrypted binding information) and the call forwarding indication in the message.

In step 510, the KMS can acquire that the call is in a call forwarding case according to the call forwarding indication included in the information, sends the query request to the corresponding AS according to the AS identifier, where the query request includes the called party identifier, that is, ID-B and the call-forwarded party identifier, that is, ID-C.

In step 511, the AS queries whether the ID-C is the call forwarding target set by the user B according to the called party ID-B; if yes, the AS returns a "correct" message to the KMS; if no, the AS returns an "error" message to the KMS. If the KMS receives the "correct" feedback, it will proceeds to the next step; if the KMS receives the "error" feedback, then it will return the corresponding error information, and the flow ends.

In step 512, the KMS decrypts the media key information in the ticket and encrypts the media key information using the key shared with the user C, generates the RESOLVE_RESP message, and returns the RESOLVE_RESP message in the response message to the user C.

in steps 513~516, the user C receives the RESOLVE_RESP message, obtains the media key information included in the ticket decrypted by the KMS, generates the TRANSFER_RESP message, and includes the message in the 200_Ok message and replies the user A through the IMS network with the 200_OK message.

In step 517, the user A establishes the connection with the user C, and communicates the secure media streams.

Through the above-mentioned flow, the user A and the user C can obtain the key information of the encrypted media flow, thus performing the end-to-end secure encrypted media flow communication.

In the case of multiple forwarding call, in each forwarding call process of the multiple forwarding call, the call server to which the called party belongs of the current forwarding call sends the call request message to the called party of the current call forwarding, where the call request message includes the called party identifier in the current call forwarding and the called party identifier in all previous call forwarding processes. The last call-forwarded party sends the media key request message to the key management server and includes the last call-forwarded identifier and the called party identifier in all previous call forwarding processes in the media key request message. The key management server sends the query message to the call server to which the next to last call-forwarded party belongs. And the key management server includes the identifier of the last call-forwarded party and the called party identifier in all previous processes. The call server to which the next to last call-forwarded party belongs, when determining that the last call-forwarded party is the call forwarding target set by the next to last call-forwarded party, sends the query message to the call server to which the previous call-forwarded party of the next to last call-forwarded party belongs. The call server to which the next to last call-forwarded party belongs includes all called party identifiers in all previous call forwarding processes between the called party and the current call-forwarded party. It is executed according to this order. When the call server to which the called party belongs receives the query message and determines the first call-forwarded party is the call forwarding target set by the called party and notifies the key management server of the success confirmation message through each call server, the key management server determines that the last call-forwarded party is a legal call-forwarded party.

Figure 6:
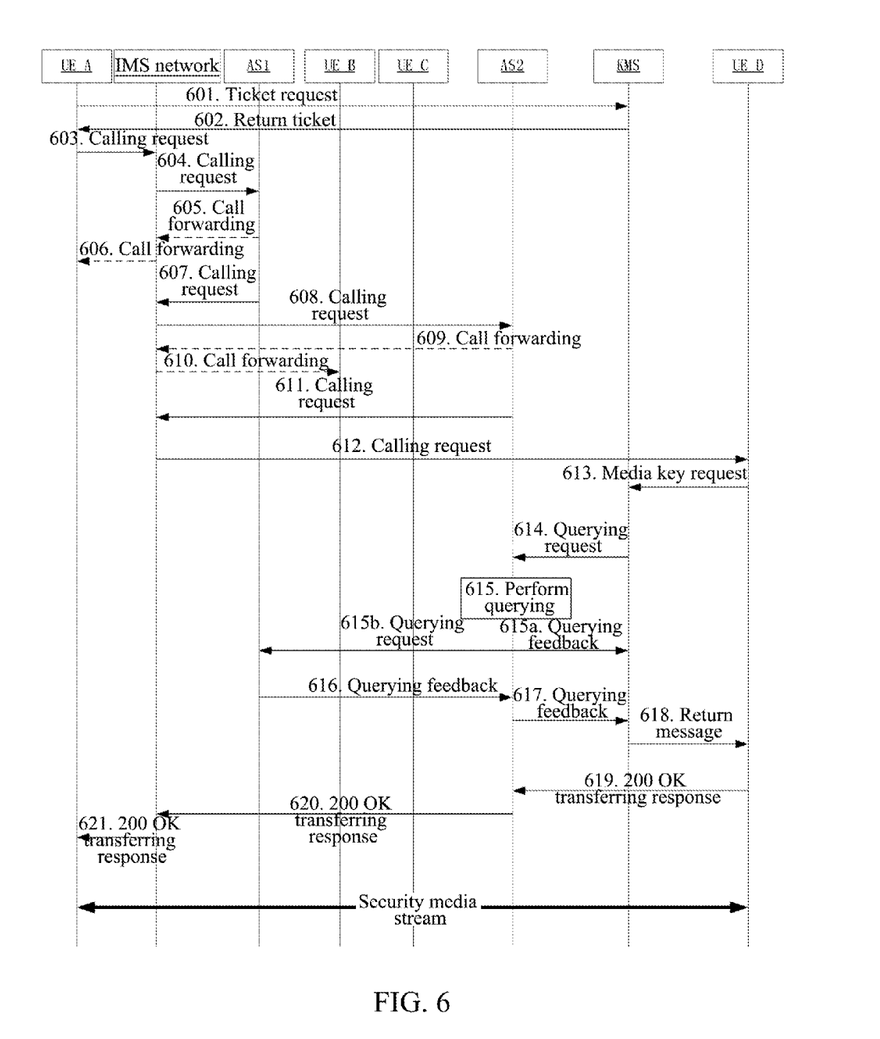
FIG. 6 is a diagram of a method for implementing secure call forwarding in multiple call forwarding using a first query mode of embodiment 2.

FIG. 6 is a diagram of a method for implementing secure call forwarding in multiple call forwarding. The user A is the calling party, the user B is the called party, the user C is the call forwarding target set by the user B, the user D is the call forwarding target set by the user C, both the user B and the user C use the call forwarding unconditional service, and the AS1 is the call server to which the user B belongs, and the AS2 is the call server to which the user C belongs.

Steps 601~606 are correspondingly the same with steps 401~406.

In step 607, the AS1 sends the call request message to the IMS, and includes in the call request message the ticket received from the user A and the identifier of the user B, that is, the ID-B and its own identifier, that is, the ID-AS1. Specifically, the AS includes above-mentioned information and the ticket received from the user A in the SIP INVITE message, and forwards the SIP INVITE message through the IMS network.

In step 608, the IMS network forwards the INVITE message to the AS2.

In steps 609~610, since the user C uses the call forwarding unconditional service, the AS2 notify the user B that the call is forwarded through the IMS network.

In step 611, the AS2 sends the call request message to the IMS, and includes in the call request message the information acquired from the AS1 and the user C identifier, that is, the ID-C and its own identifier, that is, the ID-AS2. Specifically, the AS includes above-mentioned information in the SIP INVITE message, and forwards the SIP INVITE message through the IMS network.

In step 612, the IMS sends the message received from the AS2 to the user D.

In step 613, the user D sends the media key request message to the KMS, and includes in the message the user D identifier (including the public user identifier, if common authorization mechanism GBA is used in the process, also including the GBA identifier, that is, BTID) and information received from the AS2 (including encrypted binding information) and the call forwarding indication in the message.

In step 614, the KMS can acquire that the call is in a call forwarding case according to the call forwarding indication included in the information, send the query request to the AS2 according to the AS2 identifier, and the query request at least includes the ID-B, ID-C, ID-D and ID-AS1.

In step 615, the AS2 quires whether the user D is the call forwarding target set by the user C according to user C identifier; if yes, it will proceed to the step 615b; if no, it will execute the step 615a.

In step 615a, the AS2 returns a query feedback message indicating "error" to the KMS, and the KMS returns the corresponding error information to the related equipment, and the flow ends.

In step 615b, the AS2 continuously sends the query request message to the AS1 according to the AS1 identifier, and the request message includes the ID-B and the ID-C.

In step 616, the AS1 queries whether the user C is the call forwarding target set by the user B according to the user B identifier; if yes, then the AS1 will return the query feedback message indicating "correct" to the AS2; if no, then the AS1 will return the query feedback message indicating "error" to the AS2.

In step 617, the AS2 forwards the query result to the KMS. If the KMS receives the "correct" feedback, then it proceeds to the next step; if receiving the "error" feedback, then it returns the corresponding error information and ends the flow.

In step 618, the KMS decrypts the media key information in the ticket, and encrypts the media key information using the key shared with the user D, generates the RESOLVE_RESP message, and returns the RESOLVE_RESP message in the response message to the user D.

in steps 619~621, the user D receives the RESOLVE_RESP message, obtains the media key information included in the ticket decrypted by the KMS, generates the TRANSFER_RESP message, includes the message in the 200_Ok message, and replies the user A through the IMS network with the 200_OK message.

In step 622, the user A establishes the connection with the user D, and communicates the secure media streams.

Through the above-mentioned flow, the user A and the user D can obtain the key information of the encrypted media stream, thus performing the end-to-end secure encrypted media stream communication.

In the second implementation mode of embodiment 2, the KMS sends the call-forwarded party identifier in the call forwarding process to the AS to perform the query, the AS returns the call forwarding target list set by the call-forwarded party, and the KMS judges the legality of the call-forwarded party according to the list. The process of the key management server obtaining the legal call-forwarded party information of the called party through the application server includes: the application server returns the call forwarding user identifier list of the called party according to the called party information provided by the key management server;

and the key management server judges whether the call-forwarded party is the legal call-forwarded party of the called party.

The first implementation mode is applied to two cases of call forwarding: one is single call forwarding, and the other is multiple call forwarding.

In the single call forwarding case, the call-forwarded party, after receiving the call request message sent by the call sever to which the called party belongs, sends the media key request message to the key management server, and includes the identifier of the call-forwarded party in the media key request message. The key management server sends a query message to the call server to which the called party belongs, and includes the identifier of the called party in the query message. The call server to which the called party belongs sends the call forwarding target list set by the called party to the key management server. And the key management server determines that the call-forwarded party is a legal call-forwarded party when verifying that the call-forwarded party identifier lies in the list.

Figure 7:
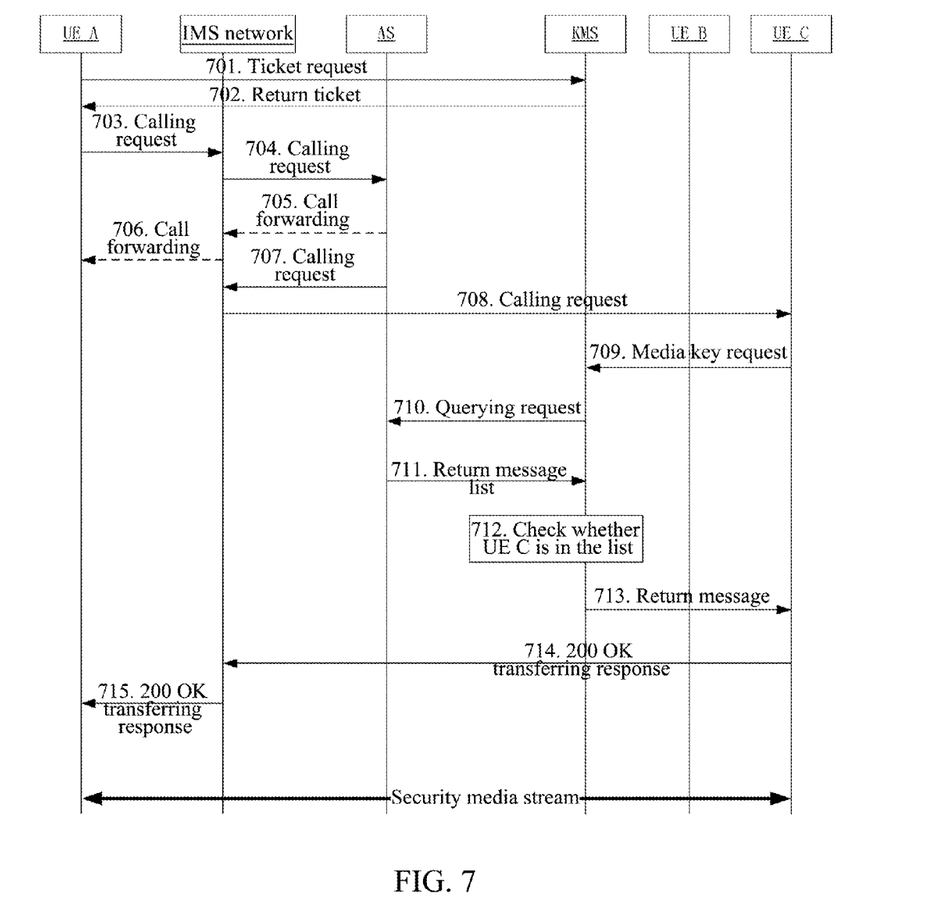
FIG. 7 is a diagram of a method for implementing secure call forwarding in single call forwarding using a second query mode of embodiment 2.

FIG. 7 is a diagram of a method for implementing secure call forwarding in single call forwarding. The user A is the calling party, the user B is the called party, the user C is the call forwarding target set by the user B, that is, the call-forwarded party, and the AS is the call server to which the called party belongs.

Steps 701~709 are correspondingly the same with steps 501~509;

In step 710, the KMS can acquire that the call is in a call forwarding case according to the call forwarding indication included in the information, send the query request to the AS, wherein the query request includes the called party identifier, that is, ID-B.

In step 711, the AS queries the call forwarding target list set by the user B according to the user B identifier, that is, the ID-B, and returns the list to the KMS.

In step 712, the KMS judges whether the user C identifier is in the list; if yes, then it proceeds to next step; or else, the session ends.

In step 713, the KMS decrypts the media key information in the ticket and encrypts the media key information using the key shared with the user C, generates the RESOLVE_RESP message, and returns the RESOLVE_RESP message in the response message to the user C.

in steps 714~715, the user C obtains the media key information included in the ticket decrypted by the KMS, generates the TRANSFER_RESP message, includes the message in the 200_Ok message, and replies the user A through the IMS network with the 200_OK message.

In step 716, the user A establishes the connection with the user C, and communicates the secure media streams.

Through the above-mentioned flow, the user A and the user C can obtain the key information of the encrypted media stream, thus performing the end-to-end secure encrypted media flow communication.

In the case of multiple forwarding call, in each forwarding call process of the multiple forwarding call, the call server to which the called party belongs sends the call request message to the call server to which the call-forwarded party of the current call forwarding belongs. The last call-forwarded party sends the media key request message to the key management server and includes the last call-forwarded identifier after receiving the call request message. The key management server sends the query message to the call server to which the next to last call-forwarded party belongs and includes the identifier of the last call-forwarded party. After receiving the call forwarding target list set by the next to last call-forwarded party from the call server to which the next to last call-forwarded party, it is verified that the last call-forwarded party identifier lies in the list. The key management server sends the query message to the call server of which the previous call-forwarded party of the next to last call-forwarded party belongs according to the order from back to forward of execution time of each call forwarding, and includes the identifier of the previous one call-forwarded party of the next to last call-forwarded party. The key management server also judges according to the returned call forwarding target list; and so forth. When receiving the call forwarding target list set by the called party and returned by the call server to which the called party belongs and determining that the identifier of first call-forwarded party lies in the list, the key management server determines that the last call-forwarded party is a legal call-forwarded party.

The key management server of the present invention includes:

a message receiving module, configured to receive a media key request message of a call-forwarded party of a call; and an authentication module, configured to authenticate the call-forwarded party according to call forwarding information of a called party provided by an application server.

Wherein, the authentication module is configured to judge whether the call-forwarded party is a legal call-forwarded party of the called party according to encrypted binding relation information of the called party and the call-forwarded party provided by the application server; and the encrypted binding relation information is included in the media key request message.

The key management server further includes a message sending module, configured to send a request message including the called party information to the application server, to request the application server to return a call forwarding user identifier list of the called party; and the authentication module is configured to judge whether the call-forwarded party is a legal call-forwarded party of the called party according to the call forwarding user identifier list of the called party returned by the application server.

The key management server further includes a message sending module, configured to send a request message including the information of the called party and the call-forwarded party to the application server, to request the application server to judge whether the call-forwarded party is a legal call-forwarded party of the called party; and the authentication module is configured to acquire whether the call-forwarded party is a legal call-forwarded party of the called party according to a judging result returned by the application server.

The application server of the present invention includes:

a judging module, configured to judge whether the call-forwarded party is a legal call-forwarded party of the called party according to information of a called party and a call-forwarded party provided by a key management server; and a sending module, configured to feed back a judging result to the key management server.

In the present invention, the call server can communicate directly with the key management server (KMS), and also can perform the communication through the intermediate network elements, for example, through the bootstrapping service function (BSF for short) server to communicate.

In the present invention, each user and AS can establish the trusting relationship with the KMS through the GBA mode, and through the key negotiation protocol, each user and AS establishes the shared key with the KMS; if the GBA is unable to be used, the user can use other authentication modes to obtain the shared key with the KMS. The specific implementation is the habitually practice technological means of the skilled in the art, and it will no longer go into details here. In the secure solution flow of all cases of the present invention, the shared keys of the user terminal A, B, C, AS with the KMS are Ka, Kb, Kc, Kas respectively, and they have already established the secure channel with the KMS, and the corresponding GBA identifiers are BTIDa, BTIDb, BTIDc, BTIDas.

The above description is only the preferred embodiments of the present invention and is not intended to limit the protection scope of the present invention. All of modifications, equivalents and/or variations without departing from the spirit and essence of the present invention should be embodied in the scope of the present invention.

INDUSTRIAL APPLICABILITY

The present invention provides a new key negotiation mechanism that the secure call forwarding is implemented in the IMS system and basically keeps the message format of the original IMS system.

What is claimed is:

1. A method for implementing secure call forwarding, comprising:
a calling party user equipment (UE-A) calling a called party user equipment (UE-B), and the called party UE-B enabling a subscribed call forwarding service;
a key management server (KMS) obtaining information of an authentic call-forwarded party user equipment (UE-C) of the called party UE-B through an application server,
wherein the step of the KMS obtaining information of an authentic call-forwarded party UE-C of the called party UE-B through an application server comprises:
the application server including encrypted binding relation information of the called party UE-B and the call-forwarded party UE-C in a call request message and sending the call request message to the call-forwarded party UE-C; and
the key management server judging whether the call-forwarded party UE-C is an authentic call-forwarded party UE-C of the called party UE-B according to the message including the encrypted binding relation information sent by the call-forwarded party UE-C, wherein the encrypted binding relation information refers to the binding information of the user B and the user C encrypted by using a shared key of the application server and the KMS;
the call-forwarded party UE-C obtaining a media key from the key management server, wherein the media key refers to a key for protecting a media flow; and
the calling party UE-A establishing a call connection with the call-forwarded party UE-C.

2. The method according to claim 1, wherein,
the encrypted binding relation information of the called party UE-B and the call-forwarded party UE-C comprises encrypted binding information of a called party identifier and a call-forwarded party identifier in a current call forwarding and the encrypted binding information of the called party identifier and the call-forwarded party identifier in all previous call forwarding.

3. The method according to claim 1, wherein,
the step of the key management server obtaining information of an authentic call-forwarded party UE-C of the called party UE-B through an application server comprises:

the application server judging whether the call-forwarded party UE-C is an authentic call-forwarded party UE-C of the called party UE-B according to information of the called party UE-B and the call-forwarded party UE-C provided by the key management server, and feeding a judging result back to the key management server.

4. The method according to claim 1, wherein, the step of the key management server obtaining information of an authentic call-forwarded party UE-C of the called party UE-B through an application server comprises:
the application server returning a call forwarding user identifier list of the called party UE-B to the key management server according to the called party UE-B information provided by the key management server; and
the key management server judging whether the call-forwarded party UE-C is an authentic call-forwarded party of the called party UE-B according to the call forwarding user identifier list of the called party UE-B.

5. A system for implementing secure call forwarding, comprising: a calling party user equipment (UE-A), a called party user equipment (UE-B), a call-forwarded party user equipment (UE-C), an application server and a key management server;
the calling party UE-A is configured to call the called party UE-B;
the called party UE-B is configured to enable a subscribed call forwarding service according to a call of the calling party UE-A;
the key management server is configured to obtain information of an authentic call-forwarded party of the called party UE-B through the application server, is configured to judge whether the call-forwarded party UE-C is an authentic call-forwarded party of the called party UE-B according to the message carrying the encrypted binding relation information sent by the call-forwarded party UE-C, wherein the encrypted binding relation information refers to the binding information of the user B and the user C encrypted by using a shared key of the application server and the KMS;
the key management server is further configured to judge whether the call-forwarded party UE-C is an authentic call-forwarded party of the called party UE-B according to the message carrying the encrypted binding relation information sent by the call-forwarded party UE-C; and
the call-forwarded party UE-C is configured to obtain a media key from the key management server.

6. The system according to claim 5, wherein,
the application server is configured to send the call request message to the call-forwarded party UE-C, and include encrypted binding information of a called party identifier and a call-forwarded party identifier in a current call forwarding, and the encrypted binding information of the called party identifier and the call-forwarded party identifier in all previous call forwarding, in the call request message.

7. The system according to claim 5, wherein,
the application server is configured to judge whether the call-forwarded party UE-C is an authentic call-forwarded party UE-C of the called party UE-B according to information of the called party identifier and the call-forwarded party provided by the key management server, and feeding the judging result back to the key management server.

8. The system according to claim 5, wherein,
the application server is configured to return a call forwarding user identifier list of the called party UE-B to the key management server according to the called party information provided by the key management server; and the key management server is configured to judge whether the call-forwarded party UE-C is an authentic call-forwarded party of the called party UE-B according to the call forwarding user identifier list of the called party UE-B.

9. A key management server, comprising a processor and a storage device, wherein the storage device stores processor-executable programs, and the programs comprise:

a message receiving module, configured to receive a media key request message of a call-forwarded party user equipment (UE-C) of a call; and an authentication module, configured to authenticate the call-forwarded party UE-C according to call forwarding information of a called party user equipment (UE-B) provided by an application server.

10. The key management server according to claim 9, wherein, the authentication module is configured to judge whether the call-forwarded party UE-C is an authentic call-forwarded party UE-C of the called party UE-B according to encrypted binding relation information of the called party UE-B and the call-forwarded party UE-C provided by the application server, wherein the encrypted binding relation information is included in the media key request message.

11. The key management server according to claim 9, further comprising a message sending module, wherein:

the message sending module is configured to send a request message including the called party UE-B information to the application server, to request the application server to return a call forwarding user identifier list of the called party UE-B; and the authentication module is configured to judge whether the call-forwarded party UE-C is an authentic call-forwarded party of the called party UE-B according to the call forwarding user identifier list of the called party UE-B returned by the application server.

12. The key management server according to claim 9, further comprising a message sending module, wherein:

the message sending module is configured to send the request message carrying the information of the called party UE-B and the call-forwarded party UE-C to the application server, to request the application server to judge whether the call-forwarded party UE-C is an authentic call-forwarded party of the called party UE-B; and the authentication module is configured to acquire whether the call-forwarded party UE-C is an authentic call-forwarded party UE-C of the called party UE-B according to the judging result returned by the application server.

* * * * *

UNITED STATES PATENT AND TRADEMARK OFFICE
CERTIFICATE OF CORRECTION

| | | |
|---|---|---|
| PATENT NO. | : 9,077,806 B2 | Page 1 of 1 |
| APPLICATION NO. | : 13/258258 | |
| DATED | : July 7, 2015 | |
| INVENTOR(S) | : Tian Tian et al. | |

It is certified that error appears in the above-identified patent and that said Letters Patent is hereby corrected as shown below:

On the title page, item 75 Inventors, Lines 1-2
　　Please delete "Yumen Zhu" and replace with --Yunwen Zhu--.

Signed and Sealed this
First Day of December, 2015

Michelle K. Lee
*Director of the United States Patent and Trademark Office*